(12) United States Patent
Onishi

(10) Patent No.: US 10,359,658 B2
(45) Date of Patent: *Jul. 23, 2019

(54) ELECTRO-OPTICAL DEVICE AND ELECTRONIC EQUIPMENT

(71) Applicant: Japan Display Inc., Tokyo (JP)

(72) Inventor: Yasunori Onishi, Nagano (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/020,393

(22) Filed: Jun. 27, 2018

(65) Prior Publication Data

US 2018/0321542 A1 Nov. 8, 2018

Related U.S. Application Data

(63) Continuation of application No. 15/624,016, filed on Jun. 15, 2017, now abandoned, which is a
(Continued)

(51) Int. Cl.
*G02F 1/1362* (2006.01)
*G02F 1/1333* (2006.01)
(Continued)

(52) U.S. Cl.
CPC ....... *G02F 1/133308* (2013.01); *G02B 6/005* (2013.01); *G02B 6/0073* (2013.01); *G02B 6/0088* (2013.01); *G02F 1/1339* (2013.01); *G02F 1/13439* (2013.01); *G02F 1/133512* (2013.01); *G02F 1/133528* (2013.01); *G02F 1/134336* (2013.01); *G02F 1/134363* (2013.01); *G02F 1/136204* (2013.01); *G02F 1/13363* (2013.01); *G02F 1/133514* (2013.01); *G02F 1/133723* (2013.01); *G02F 2001/133314* (2013.01); *G02F 2001/133317* (2013.01); *G02F 2001/133334* (2013.01); *G02F 2001/133562* (2013.01); *G02F 2001/133567* (2013.01); *G02F 2001/134372* (2013.01); *G02F 2201/121* (2013.01); *G02F 2201/123* (2013.01); *G02F 2202/28* (2013.01)

(58) Field of Classification Search
CPC ......... G02F 1/136204; G02F 1/133308; G02F 2202/22; G02F 2202/501
See application file for complete search history.

(56) References Cited

U.S. PATENT DOCUMENTS

| | | |
|---|---|---|
| 2001/0024184 A1 | 9/2001 | Maeda |
| 2005/0030443 A1 | 2/2005 | Nagahama |

(Continued)

FOREIGN PATENT DOCUMENTS

JP 2005-43901 2/2005

*Primary Examiner* — Thanh Nhan P Nguyen
(74) *Attorney, Agent, or Firm* — K&L Gates LLP

(57) ABSTRACT

An electro-optical devices includes: a first substrate; a second substrate having one surface opposite to the first substrate; a support member configured to hold the first and second substrates with the second substrate located outside the first substrate, and to include a frame portion surrounding the first and second substrates; a first conductive film formed on the other surface of the second substrate; and a conductor layer placed between the frame portion and the first and second substrates, and electrically connected to the first conductive film. The first conductive film is held at a constant potential via the conductor layer.

10 Claims, 15 Drawing Sheets

Related U.S. Application Data continuation of application No. 15/182,137, filed on Jun. 14, 2016, now Pat. No. 9,709,837, which is a continuation of application No. 14/719,579, filed on May 22, 2015, now Pat. No. 9,377,643, which is a continuation of application No. 14/268,751, filed on May 2, 2014, now Pat. No. 9,069,200, which is a continuation of application No. 13/025,680, filed on Feb. 11, 2011, now Pat. No. 8,754,997.

(51) Int. Cl.
| | | |
|---|---|---|
| *G02F 1/1343* | (2006.01) | |
| *F21V 8/00* | (2006.01) | |
| *G02F 1/1335* | (2006.01) | |
| *G02F 1/1339* | (2006.01) | |
| *G02F 1/13363* | (2006.01) | |
| *G02F 1/1337* | (2006.01) | |

(56) References Cited

U.S. PATENT DOCUMENTS

| | | |
|---|---|---|
| 2005/0206796 A1 | 9/2005 | Okabe |
| 2006/0139501 A1 | 6/2006 | Lee et al. |
| 2007/0252922 A1 | 11/2007 | Oohira |
| 2008/0088765 A1 | 4/2008 | Hashimoto |
| 2009/0033825 A1 | 2/2009 | Fukayama et al. |
| 2009/0147174 A1 | 6/2009 | Ha |
| 2009/0207560 A1 | 8/2009 | Lee |
| 2009/0310055 A1 | 12/2009 | Kim et al. |
| 2010/0182529 A1 | 7/2010 | Nakanishi |
| 2011/0134355 A1 | 6/2011 | Yi |

ELECTRO-OPTICAL DEVICE AND ELECTRONIC EQUIPMENT

CROSS REFERENCES TO RELATED APPLICATIONS

The present application is a continuation application of U.S. patent application Ser. No. 15/624,016, filed on Jun. 15, 2017, which is a continuation application of U.S. patent application Ser. No. 15/182,137, filed on Jun. 14, 2016, issued as U.S. Pat. No. 9,709,837 on Jul. 18, 2017, which application is a continuation application of U.S. patent application Ser. No. 14/719,579, filed on May 22, 2015, issued as U.S. Pat. No. 9,377,643, on Jun. 28, 2016, which application is a continuation of U.S. patent application Ser. No. 14/268,751, filed on May 2, 2014, issued as U.S. Pat. No. 9,069,200, on Jun. 30, 2015, which application is a continuation of U.S. patent application Ser. No. 13/025,680, filed on Feb. 11, 2011, issued as U.S. Pat. No. 8,754,997, on Jun. 17, 2014, which application contains subject matter related to that disclosed in Japanese Priority Patent Application JP 2008-197471 filed in the Japan Patent Office on Jul. 31, 2008, the entire contents of which are hereby incorporated by reference.

BACKGROUND

The present application relates to an electro-optical device including an insulating opposite substrate, a surface of which is opposite to a device substrate and formed with no wiring or electrode, and electronic equipment including the electro-optical device.

Electro-optical devices, in which no wiring or electrode is formed on an opposite substrate arranged opposite to a device substrate formed with signal lines, pixel electrodes, and pixel switching elements, include a liquid crystal device based on the IPS (In Plane Switching) system or the FFS (Fringe Field Switching) system. In the liquid crystal device, the opposite substrate is arranged outside the device substrate, i.e., on the output side of display light. Therefore, the opposite substrate is easily charged, and the charging disturbs the orientation of liquid crystal. In view of this, a method has been proposed which forms a front surface-side conductive film on the outer surface of the opposite substrate and brings the front surface-side conductive film into contact with a metal outer frame, to thereby have the opposite substrate held at the ground potential and prevented from being charged (see Japanese Unexamined Patent Application Publication No. 2005-43901).

SUMMARY

The configuration by which the front surface-side conductive film formed on the opposite substrate is simply brought into contact with the outer frame, however, has an issue of failure to reliably hold the front surface-side conductive film at the ground potential.

Further, in a transmissive or semi-transmissive reflective liquid crystal device, insulating members, such as a light guide plate and a variety of optical sheets of a backlight device, are arranged in a superimposed manner on the side of the other surface of the device substrate. Such a liquid crystal device has an issue in that, if a common potential of a predetermined frequency is applied to a common electrode formed on the device substrate, charging of the light guide plate or the variety of optical sheets occurs and causes high-frequency noise. That is, if the charged state of the light guide plate or the optical sheets changes in conjunction with the change in potential of the common electrode, vibration occurs in the light guide plate or the optical sheets, and vibration in an audible range of 10 to 25 kHz causes high-frequency noise sound.

In view of the above-described issues, it is desirable in the present application to provide an electro-optical device and electronic equipment capable of reliably preventing the charging of the opposite substrate.

It is also desirable in the present application to provide an electro-optical device and electronic equipment capable of reliably preventing the charging of the insulating members arranged on the side of the other surface of the device substrate, as well as the charging of the opposite substrate.

According to an embodiment, there is provided an electro-optical device which includes: a first substrate; a second substrate having one surface opposite to the first substrate; a support member configured to hold the first and second substrates with the second substrate located outside the first substrate, and to include a frame portion surrounding the first and second substrates; a first conductive film formed on the other surface of the second substrate; and a conductor layer placed between the frame portion and the first and second substrates, and electrically connected to the first conductive film. The first conductive film is held at a constant potential via the conductor layer. In the embodiment, the conductor layer may use a conductive paste including a matrix material and a plurality of conductive particles contained in the matrix material. Further, in the embodiment, the first substrate may be a device substrate having an inner surface formed with pixel electrodes, switching elements connected to the pixel electrodes, and wiring connected to the switching elements, and the second substrate may be an opposite substrate opposite to the device substrate. Of course, an opposite substrate may be used as the first substrate, and a device substrate may be used as the second substrate.

In the embodiment, the "electro-optical device" refers to a device which modulates light on the basis of an electrical signal, such as a liquid crystal device and an organic electroluminescence device, and a device which converts an optical signal into an electrical signal, such as an image sensor.

In the embodiment, a gap between the opposite substrate and the frame portion surrounding the respective peripheries of the device substrate and the opposite substrate in the support member is filled with the conductor layer, which may contain conductive particles dispersed in a matrix material, and the conductor layer is electrically connected to the first conductive film formed on the other surface of the opposite substrate. If the conductor layer is held at a constant potential, therefore, the first conductive film is also held at a constant potential via the conductor layer. Accordingly, it is possible to prevent the second substrate from being charged. Herein, the conductor layer may be a layer containing conductive particles dispersed in a matrix material, and can be formed by the application and subsequent hardening of a conductive paste. It is therefore possible to reliably achieve electrical connection between the first conductive film and the conductor layer, and to easily and reliably achieve, in the gap between the second substrate and the frame portion or in a deep portion of the gap, electrical connection of the conductor layer to another member held at a constant potential. Accordingly, it is possible to reliably prevent the opposite substrate from being charged.

Preferably, in the embodiment, an inner surface of the frame portion may be formed with an indentation, and an air gap formed by the indentation may be filled with the conductor layer. With this configuration, it is possible to fill the gap between the frame portion of the support member and the second substrate with a sufficient amount of the conductor layer (conductive paste). Accordingly, it is possible to reliably achieve, in the gap between the second substrate and the frame portion or in a deep portion of the gap, electrical connection of the conductor layer to another member held at a constant potential.

Preferably, in the embodiment, the first substrate may be attached with a conductive tape for fixing the first substrate to the support member, and the conductive tape may be in contact with the conductor layer. On the side of the other surface of the first substrate, a wiring substrate, such as a flexible substrate, is present. If the conductive tape in contact with the conductor layer is arranged on the side of the other surface of the first substrate, therefore, it is possible to hold the conductive tape at a constant potential via the wiring substrate or the like, and consequently to hold the front surface-side conductive film at a constant potential via the conductive tape.

The present application in an embodiment may adopt a configuration which further includes a wiring substrate connected to the first substrate, in which the wiring substrate is formed with wiring held at a constant potential, and in which the conductive tape is electrically connected to the wiring.

The present application in an embodiment may adopt a configuration in which the support member further includes a metal case held at a constant potential, and in which the first substrate is attached to the metal case via the conductive tape.

The present application in an embodiment may adopt a configuration which further includes a second conductive film formed on the other surface of the first substrate and an insulating member arranged on the side of the other surface of the first substrate, in which a base material of the first substrate is an insulating substrate, and in which the conductive tape is attached to and electrically connected to the second conductive film on the side of the other surface of the first substrate. With this configuration, it is possible to hold the second conductive film formed on the other surface of the first substrate at a constant potential by using the conductive tape used to hold the first conductive film at a constant potential, and to prevent the insulating member from being charged.

The present application in an embodiment may adopt a configuration in which the support member further includes a metal case held at a constant potential, with at least a portion of the metal case exposed to the inside in the frame portion, and in which the conductor layer is electrically connected to the exposed portion. With this configuration, it is possible to hold the conductor layer at a constant potential via the metal case, and to hold the first conductive film at a constant potential via the conductor layer.

Also in this case, the present application in an embodiment may preferably include a second conductive film formed on the other surface of the first substrate, an insulating member arranged on the side of the other surface of the first substrate, and a conductive tape attached to and electrically connected to the second conductive film on the side of the other surface of the first substrate. Further, a base material of the first substrate may be an insulating substrate, and the conductor layer may be electrically connected to the conductive tape. With this configuration, it is possible to hold the conductive tape at a constant potential via the conductor layer for holding the first conductive film at a constant potential, and to hold the second conductive film formed on the other surface of the first substrate at a constant potential. Accordingly, it is possible to prevent the insulating member from being charged.

The electro-optical device applied with the embodiment of the present application is used in electronic equipment, such as a mobile computer, a mobile phone, a car navigation device, and a personal computer.

Additional features and advantages are described herein, and will be apparent from the following Detailed Description and the figures.

DETAILED DESCRIPTION

Figure 1:
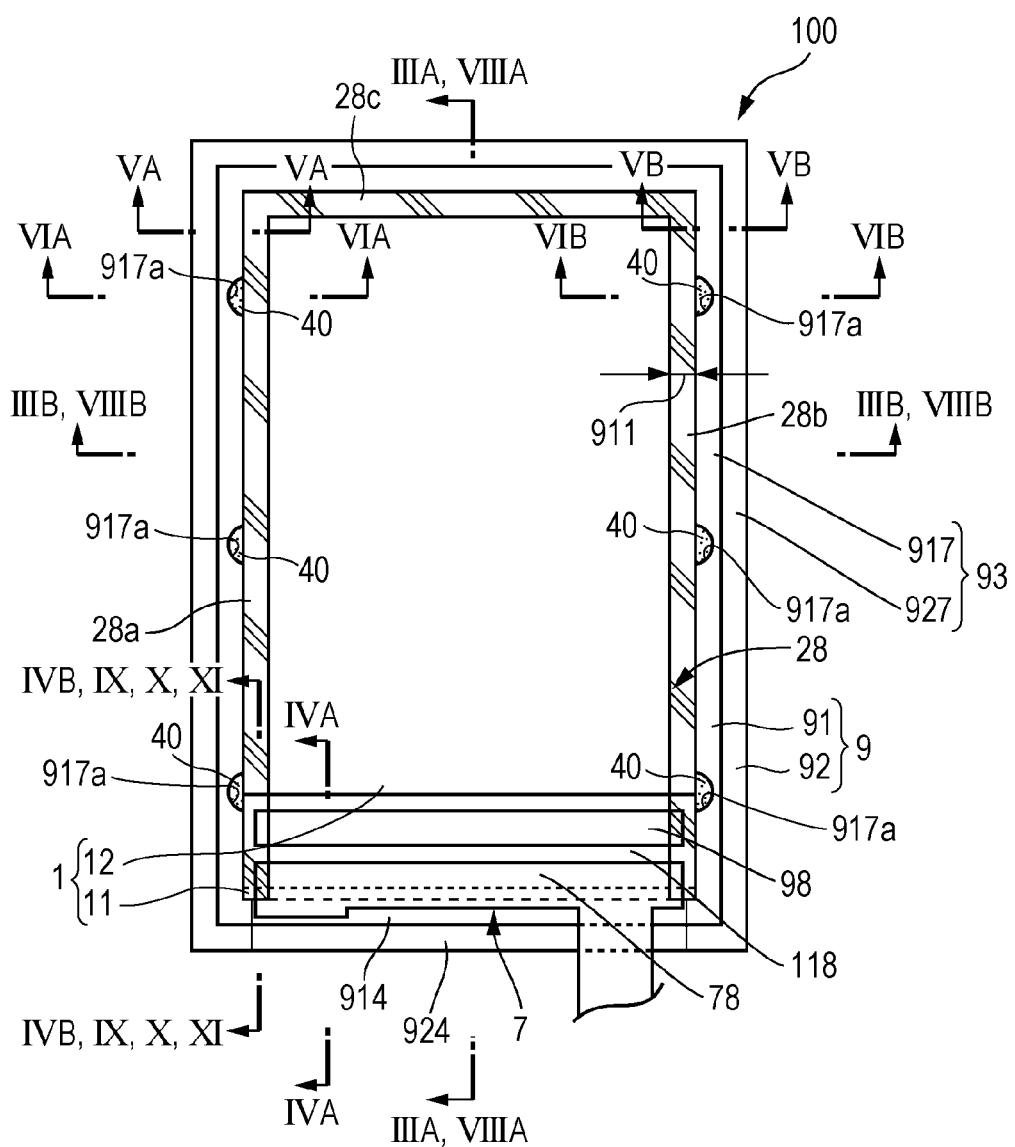
FIG. 1 is a plan view of electro-optical devices according to first and second embodiments and modified examples of the second embodiment.

With reference to the drawings, embodiments of the present application will be described. In the drawings referred to in the following description, different scales are used for individual layers and components to illustrate the layers and components in a recognizable size in the drawings.

First Embodiment

Figure 2:
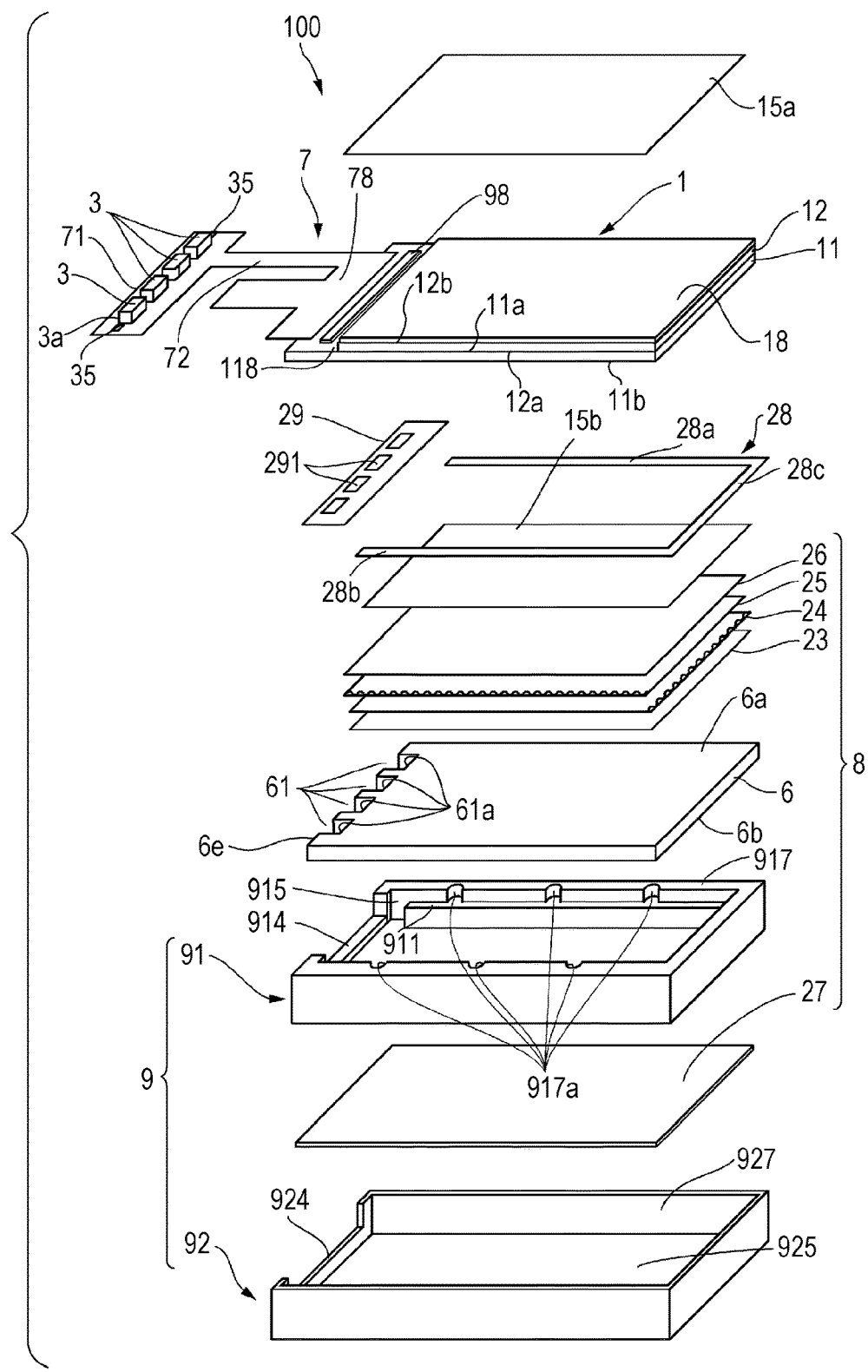
FIG. 2 is an exploded perspective view of the electro-optical device according to the first embodiment.
Figure 3A:
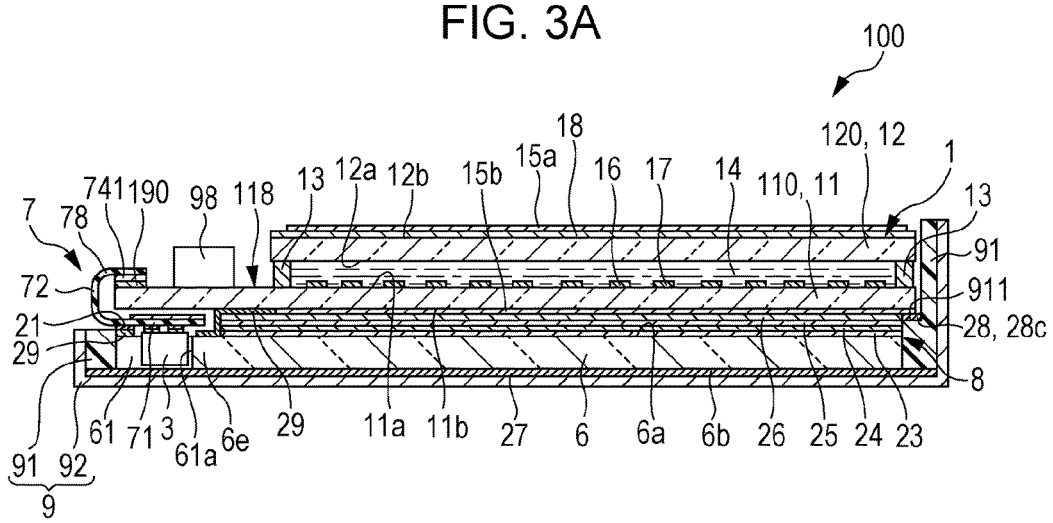
FIGS. 3A and 3B are cross-sectional views schematically illustrating the electro-optical device according to the first embodiment cut at positions corresponding to lines IIIA-IIIA and IIIB-IIIB in FIG. 1, respectively.
Figure 3B:
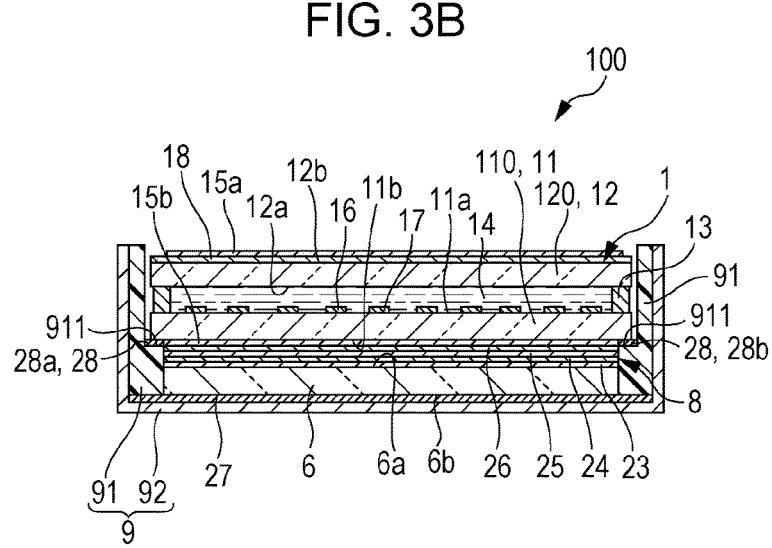
Figure 4A:
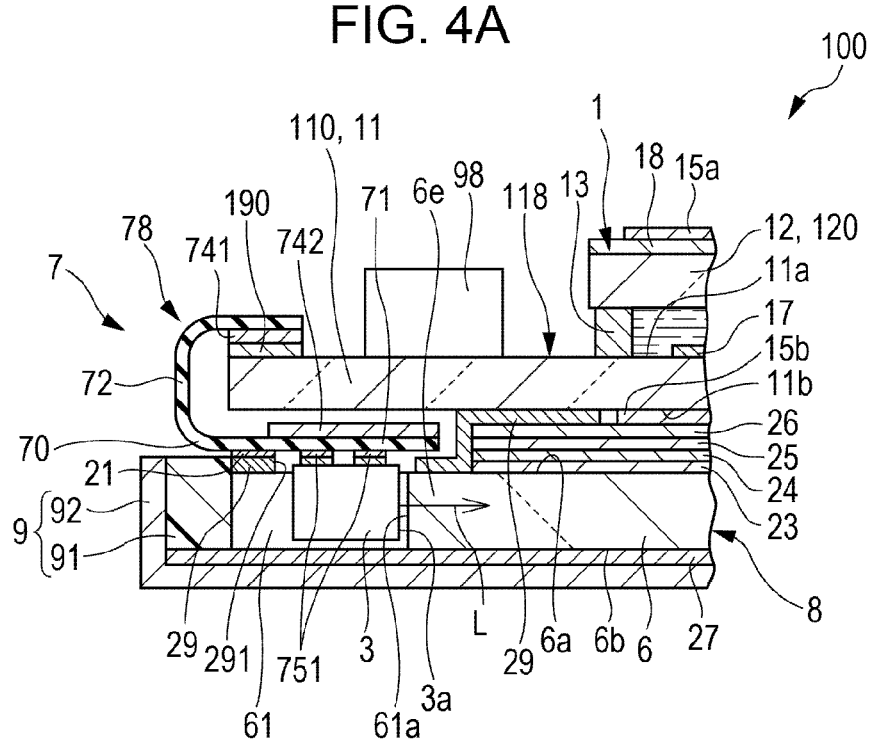
FIGS. 4A and 4B are cross-sectional views schematically illustrating the electro-optical device according to the first embodiment cut at positions corresponding to lines IVA-IVA and IVB-IVB in FIG. 1, respectively.
Figure 4B:
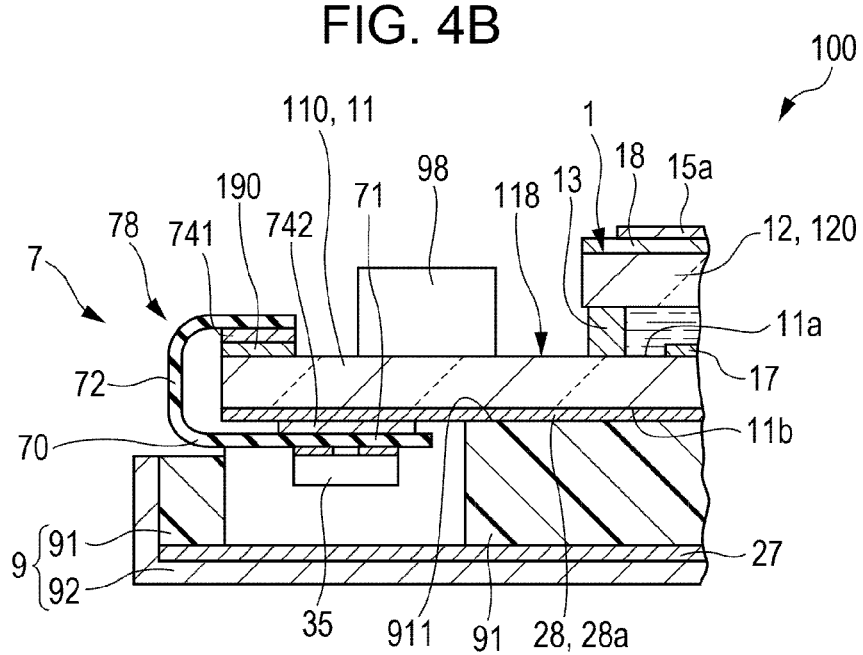

Overall Configuration of Electro-Optical Device: FIGS. 1 and 2 are a plan view and an exploded perspective view of an electro-optical device according to a first embodiment. FIGS. 3A and 3B are cross-sectional views schematically illustrating the electro-optical device according to the first embodiment cut at positions corresponding to lines IIIA-IIIA and IIIB-IIIB in FIG. 1, respectively. FIGS. 4A and 4B are cross-sectional views schematically illustrating the electro-optical device according to the first embodiment cut at positions corresponding to lines IVA-IVA and IVB-IVB in FIG. 1, respectively. In FIG. 1, an area attached with a later-described conductive tape is illustrated as a region indicated by a group of three backslashes.

As illustrated in FIGS. 1 and 2, an electro-optical device 100 (liquid crystal device) of the present embodiment includes a transmissive or semi-transmissive reflective liquid crystal panel 1 and an illumination device 8 arranged on the rear side of the liquid crystal panel 1. The illumination device 8 and the liquid crystal panel 1 are held by a support member 9. The support member 9 is formed by a rectangular frame-like resin case 91 and a box-like metal case 92 for holding the resin case 91 from outside. In the resin case 91, one of four side plate portions 917 located on the drawing side of a flexible substrate 7 is formed with a recessed portion 914, and the inner side of the remaining three side plate portions 917 is formed with a step portion 911 having an upper surface for holding the liquid crystal panel 1. A portion of the resin case 91 near the side plate portion 917 located on the drawing side of the flexible substrate 7 forms a step portion 911-absent portion 915, in which the step portion 911 is not formed. The metal case 92 includes a rectangular bottom plate portion 925 and four side plate portions 927 standing upright on the outer edge of the bottom plate portion 925. One of the side plate portions 927 located on the drawing side of the flexible substrate 7 is formed with a recessed portion 924 at a position overlapping with the recessed portion 914 of the resin case 91. The metal case 92 is held at the ground potential. In the thus configured resin case 91 and metal case 92, the side plate portions 917 and 927 are superimposed upon each other to form a frame portion 93 surrounding the periphery of the liquid crystal panel 1.

The liquid crystal panel 1 includes a device substrate 11 (first substrate), an opposite substrate 12 (second substrate) arranged opposite to a first surface 11a of the device substrate 11 (one surface of the device substrate 11), and a rectangular frame-like sealing member 13 for attaching the device substrate 11 and the opposite substrate 12 together in a substrate peripheral portion. The liquid crystal panel 1 holds liquid crystal 14, which is an electro-optical material held in a space formed by the device substrate 11, the opposite substrate 12, and the sealing member 13. Further, the device substrate 11 includes a projecting region 118 projecting from an end portion of the opposite substrate 12.

In the present embodiment, the respective base materials of the device substrate 11 and the opposite substrate 12 are translucent insulating substrates 110 and 120 made of glass or the like. The device substrate 11 and the opposite substrate 12 are held by the support member 9 such that the opposite substrate 12 is located outside the device substrate 11 (on the output side of display light).

The first surface 11a of the device substrate 11 opposite to the opposite substrate 12 is formed with insular pixel electrodes 16 formed by an ITO (Indium Tin Oxide) film or an IZO (Indium Zinc Oxide) film, pixel switching elements, signal lines (not illustrated) such as scanning lines and data lines, and so forth. Further, an oriented film (not illustrated) made of polyimide or the like is formed to cover the pixel electrodes 16.

In the present embodiment, the liquid crystal panel 1 is a liquid crystal panel based on the IPS system or the FFS system, and drives the liquid crystal 14 by using a lateral electric field. Thus, the device substrate 11 is also formed with common electrodes 17 formed by an ITO film or an IZO film. Therefore, a first surface 12a of the opposite substrate 12 opposite to the device substrate 11 (one surface of the opposite substrate 12) is not formed with the common electrodes 17, and any other electrode or wiring is not formed on first surface 12a. The first surface 12a of the opposite substrate 12 is formed with an oriented film (not illustrated), which is an insulating film. Further, the first surface 12a of the opposite substrate 12 may be formed with, for example, an internal phase difference layer and a color filter layer (not illustrated), which are also insulating layers.

The IPS system adopts a configuration in which the pixel electrodes 16 and the common electrodes 17 are opposite to each other in the lateral direction. The FFS system adopts a configuration in which the pixel electrodes 16 and the common electrodes 17 are formed in different upper and lower layers with a dielectric film interposed therebetween. The drawings referred to in the present embodiment, however, schematically illustrate the pixel electrodes 16 and the common electrodes 17 as opposite to each other in the lateral direction also in the FFS system, as well as in the IPS system.

In the liquid crystal panel 1, an upper polarizing plate 15a is arranged in a superimposed manner on a second surface 12b of the opposite substrate 12 on the opposite side of the first surface 12a opposite to the device substrate 11 (the other surface of the opposite substrate 12). Further, a lower polarizing plate 15b is arranged in a superimposed manner on a second surface 11b of the device substrate 11 on the opposite side of the first surface 11a opposite to the opposite substrate 12 (the other surface of the device substrate 11).

Herein, a translucent front surface-side conductive film 18 (first conductive film) formed by an ITO film, an IZO film, or the like is provided on the entire surface or a substantially entire surface of the second surface 12b of the opposite substrate 12 in order to prevent the opposite substrate 12 from being charged. The front surface-side conductive film 18 is held at a constant potential (ground potential in the present embodiment) by a configuration which will be described in detail later.

In the thus configured electro-optical device 100, the light output from the illumination device 8 is incident on the device substrate 11, and the incident light is optically modulated and output from the opposite substrate 12. Thereby, an image is displayed.

As illustrated in FIGS. 1, 2, 3A, and 3B, the projecting region 118 of the device substrate 11 is mounted with a drive IC (Integrated Circuit) 98 by an anisotropic conductive film or the like. A terminal 190 formed in an end portion of the projecting region 118 is connected to a terminal 741 formed in a main body portion 78 of the flexible substrate 7 serving as a wiring substrate. Therefore, a variety of externally supplied signals and power can be input to the liquid crystal panel 1 via the flexible substrate 7.

In the flexible substrate 7, a band-like portion 72 extends from the main body portion 78 thereof, and a leading end portion of the band-like portion 72 is formed with a light source mounting portion 71, the longitudinal direction of which is set to the width direction of the liquid crystal panel 1. The light source mounting portion 71 is formed with light source mounting terminals 751, which are mounted with point-like light sources 3 of the illumination device 8. Therefore, the point-like light sources 3 are supplied with a light source drive voltage via the flexible substrate 7. A surface of the flexible substrate 7 mounted with the point-like light sources 3 is also mounted with electronic components 35, such as a surface-mount capacitor.

The flexible substrate 7 is a multilayer substrate or a double-sided substrate. When the light source mounting portion 71 is viewed from the side opposite to the side mounted with the point-like light sources 3, a region overlapping with the light source mounting terminals 751 in a plan view is formed with a conductive pattern 742 with an insulating layer 70, such as a polyimide layer, interposed between the conductive pattern 742 and the light source mounting terminals 751. The conductive pattern 742 is a solid ground pattern formed all over a predetermined area without a gap. Therefore, the conductive pattern 742 is used for shielding light from the point-like light sources 3, for electromagnetic shielding, or for heat radiation. In the flexible substrate 7, the conductive pattern 742 and the terminal 741 are formed on one surface of the insulating layer 70 formed by a film base material of the flexible substrate 7, and the light source mounting terminals 751 are formed on the other surface of the insulating layer 70. In the present embodiment, the plurality of point-like light sources 3 are surface-mount white LEDs (Light-Emitting Diodes) mounted at predetermined intervals with an output light axis L set to a direction parallel to the plane of the light source mounting portion 71 of the flexible substrate 7.

Overall Configuration of Illumination Device 8: The illumination device 8 includes a substantially rectangular light guide plate 6 which has a first surface 6a serving as a light-emitting surface and directed toward the device substrate 11 of the liquid crystal panel 1, the plurality of point-like light sources 3 formed by white LEDs arranged along an end portion 6e of the light guide plate 6, a reflective sheet 27 arranged in a superimposed manner on a second surface 6b of the light guide plate 6 on the opposite side of the first surface 6a, and a plurality of optical sheets arranged in a superimposed manner on the first surface 6a of the light guide plate 6. As the plurality of optical sheets, a rectangular scattering plate 23, a rectangular prism sheet 24, a rectangular prism sheet 25, and a rectangular scattering plate 26 are sequentially arranged in a superimposed manner from the side of the light guide plate 6 toward the liquid crystal panel 1 in the present embodiment. The light guide plate 6 is for uniformly applying the light output from the point-like light sources 3 within a surface of the liquid crystal panel 1, and is made of a translucent material, such as an acrylic resin and polycarbonate. The scattering plates 23 and 26 are for improving the equalization of brightness of the light within a display screen. The prism sheets 24 and 25 are for adjusting the orientation angle of the output light and improving the brightness in the frontal direction.

The end portion 6e of the light guide plate 6 includes indentation-like light source placement openings 61 formed at predetermined intervals along a side of the end portion 6e. One of the inner walls of each of the light source placement openings 61 forms a light incident portion 61a, on which the light output from the corresponding point-like light source 3 is incident. In the flexible substrate 7, therefore, if the band-like portion 72 is bent such that the surface of the light source mounting portion 71 mounted with the point-like light sources 3 faces downward, and if the light source mounting portion 71 is superimposed on the first surface 6a in the end portion 6e of the light guide plate 6, the plurality of point-like light sources 3 are placed in the respective light source placement openings 61, with respective light output surfaces 3a facing the light incident portions 61a. In this process, a light-shielding sheet 29 having a lower surface formed with an adhesive layer is attached along the end portion 6e of the light guide plate 6, and a double-sided tape 21 is placed on the upper surface of the light-shielding sheet 29. Therefore, the light source mounting portion 71 of the flexible substrate 7 is fixed to the end portion 6e of the light guide plate 6 via the double-sided tape 21 and the light-shielding sheet 29. The light-shielding sheet 29 includes rectangular opening portions 291 formed at respective positions overlapping with the light source placement openings 61 of the light guide plate 6 in a plan view. When the light source mounting portion 71 of the flexible substrate 7 is superimposed on the light-shielding sheet 29, therefore, the plurality of point-like light sources 3 are placed in the respective light source placement openings 61 through the opening portions 291.

Figure 5A:
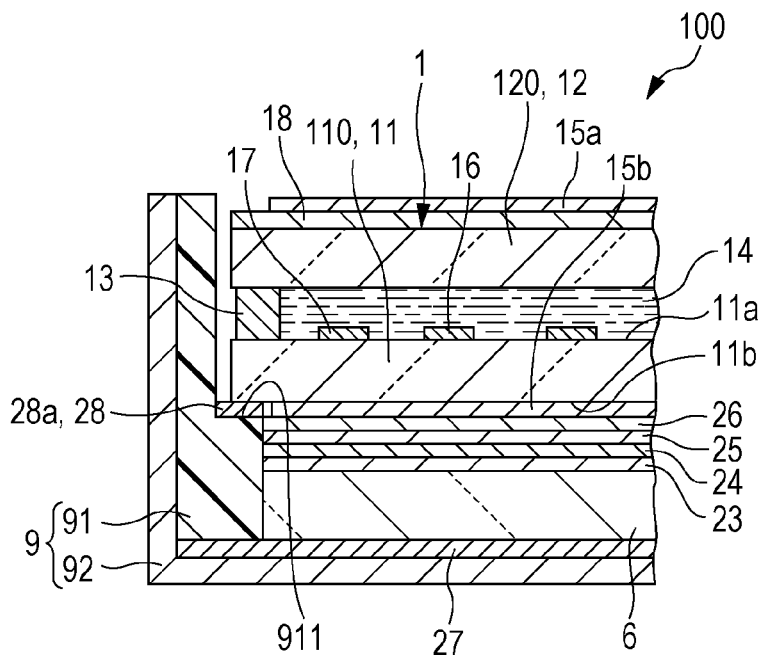
FIGS. 5A and 5B are cross-sectional views schematically illustrating the electro-optical device according to the first embodiment cut at positions corresponding to lines VA-VA and VB-VB in FIG. 1, respectively.
Figure 5B:
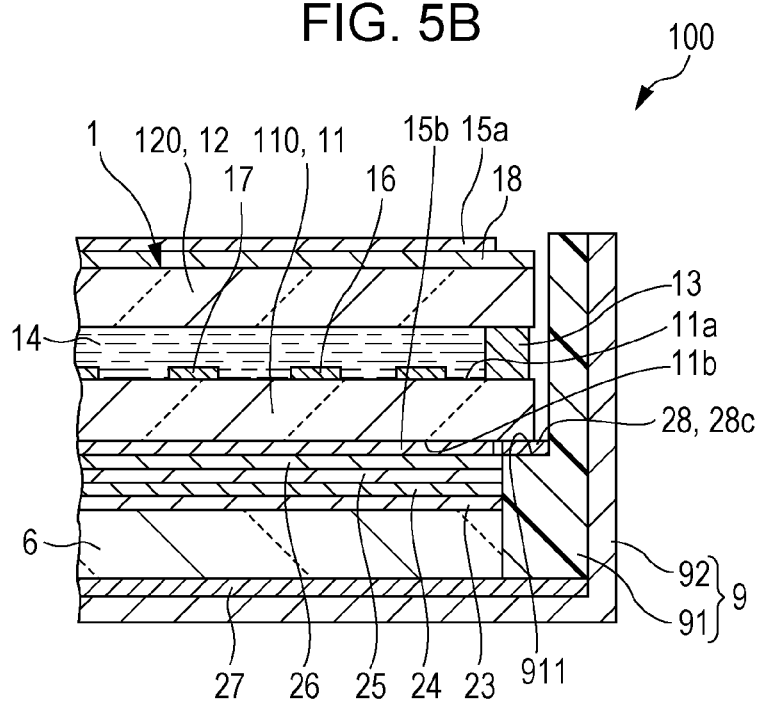
Figure 6A:
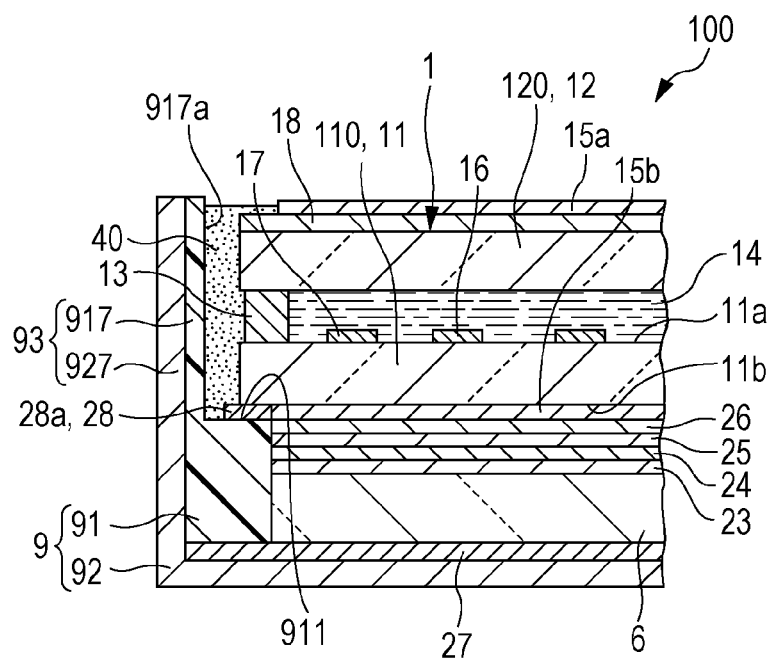
FIGS. 6A and 6B are cross-sectional views schematically illustrating the electro-optical device according to the first embodiment cut at positions corresponding to lines VIA-VIA and VIB-VIB in FIG. 1, respectively.
Figure 6B:
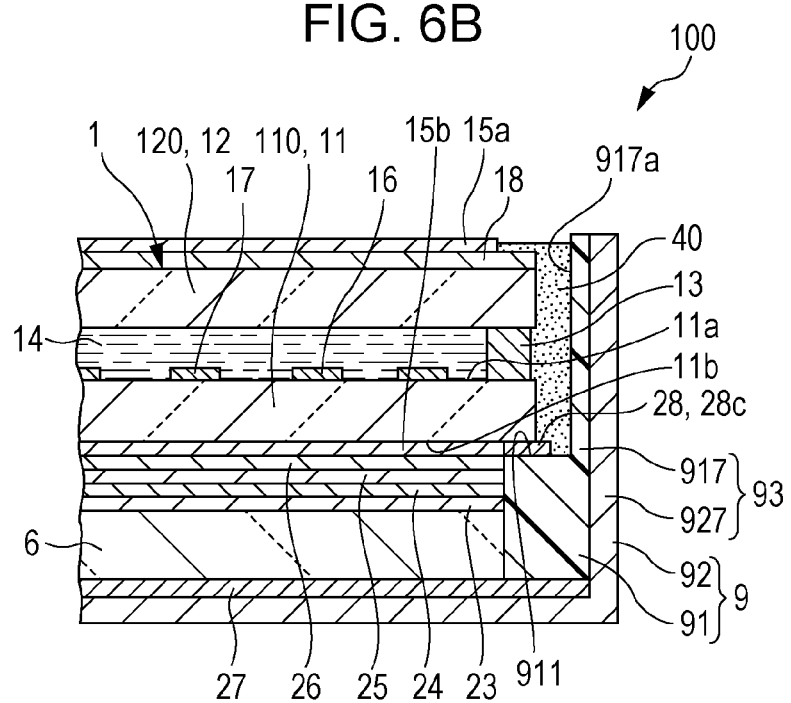

Measures against Charging of Opposite Substrate 12: FIGS. 5A and 5B are cross-sectional views schematically illustrating the electro-optical device according to the first embodiment cut at positions corresponding to lines VA-VA and VB-VB in FIG. 1, respectively. FIGS. 6A and 6B are cross-sectional views schematically illustrating the electro-optical device according to the first embodiment cut at positions corresponding to lines VIA-VIA and VIB-VIB in FIG. 1, respectively.

In the electro-optical device 100 of the present embodiment, the base material of the opposite substrate 12 is formed by the translucent insulating substrate 120, and the first surface 12a of the opposite substrate 12 is not formed with an electrode or the like. Further, the opposite substrate 12 is arranged on the outer side. If a charged finger approaches the opposite substrate 12, therefore, the opposite substrate 12 is charged. The charging disturbs the orientation of the liquid crystal 14, and degrades the image quality.

Therefore, the translucent front surface-side conductive film 18 formed by an ITO film, an IZO film, or the like is provided on the entire surface or a substantially entire surface of the second surface 12b of the opposite substrate 12. The front surface-side conductive film 18 is held at a constant potential (ground potential in the present embodiment) by the configuration described below.

First, in the present embodiment, a conductive tape 28 is attached to the second surface 11b of the device substrate 11 along three sides of the device substrate 11, as illustrated in FIGS. 1, 2, 3A, 3B, 4B, 5A, 5B, 6A, and 6B. The conductive tape 28 is a double-sided tape having a conductive adhesive layer formed on each of both surfaces of a metal film. One surface of the conductive tape 28 is bonded to the second surface 11b of the device substrate 11. Further, on the rear surface side of the projecting region 118 of the device substrate 11, the conductive tape 28 is bonded to the conductive pattern 742 (ground pattern) formed on the light source mounting portion 71 of the flexible substrate 7. Therefore, the conductive tape 28 is constantly held at the ground potential (constant potential). For example, in the conductive tape 28, a layer containing conductive powder of copper, nickel, an alloy thereof, carbon, or the like dispersed in an adhesive is used as the conductive adhesive layer. Further, a film made of a metal, such as copper, nickel, stainless steel, aluminum, an alloy thereof, or the like is used as the metal film.

Further, the conductive tape 28 has a function of fixing the device substrate 11 to the resin case 91, as illustrated in FIGS. 4B, 5A, 5B, 6A, and 6B. That is, one surface of the conductive tape 28 is bonded to the second surface 11b of the device substrate 11, and the other surface of the conductive tape 28 is bonded to the upper surface of the step portion 911 formed on the inner side of the resin case 91.

In the present embodiment, as illustrated in FIGS. 1 and 2, the conductive tape 28 is formed by three band-like portions 28a, 28b, and 28c extending along three sides of the second surface 11b of the device substrate 11 excluding one end portion corresponding to the position of the projecting region 118. The mutually adjacent band-like portions 28a and 28c are connected, and the mutually adjacent band-like portions 28b and 28c are connected. Thus, the conductive tape 28 is formed by a single tape integrally connecting the band-like portions 28a, 28b, and 28c. Herein, the lower polarizing plate 15b is bonded to the second surface 11b of the device substrate 11. Thus, the lower polarizing plate 15b is set to a size allowing the placement thereof in the area surrounded by the conductive tape 28. In the second surface 11b of the device substrate 11, the conductive tape 28 is arranged to surround the periphery of the lower polarizing plate 15b. Even if the conductive tape 28 is attached to the second surface 11b of the device substrate 11, therefore, an unnecessary gap is not formed between the second surface 11b of the device substrate 11 and the lower polarizing plate 15b. The conductive tape 28 may be configured such that the three band-like portions 28a, 28b, and 28c are divided. Preferably, each of the band-like portions 28a, 28b, and 28c may be arranged to extend along at least one side of the device substrate 11.

Further, in the present embodiment, as illustrated in FIGS. 1 and 2, inner surfaces of the side plate portions 917 of the resin case 91, which form inner surfaces of the frame portion 93 in the support member 9, are formed with a plurality of groove-like indentations 917a which extend from the upper surface of the side plate portions 917 to a position reaching the upper surface of the step portion 911. The interior of each of the plurality of indentations 917a (a gap between the frame portion 93 and the combination of the device substrate 11 and the opposite substrate 12) is filled with a conductor layer 40. The conductor layer 40 is formed by the application and subsequent hardening of a conductive paste containing conductive particles, such as carbon particles, and a matrix material, such as resin and rubber, dispersed in a solvent. The conductive particles, such as carbon particles, are dispersed in the matrix material, such as resin and rubber.

In the present embodiment, the indentations 917a are formed at substantially equal intervals in each of two of the four side plate portions 917 of the resin case 91 corresponding to the longer sides of the resin case 91. In a portion not formed with the indentations 917a, a gap between the frame portion 93 and the combination of the device substrate 11 and the opposite substrate 12 is not filled with the conductor layer 40. In the present embodiment, each of the indentations 917a is formed into a circular arc shape in a plan view. The side plate portions 917 may be formed with at least one of the indentations 917a filled with the conductor layer 40, and the indentation 917a may be formed in a side plate portion 917 corresponding to a shorter side of the resin case 91. If there is a sufficient gap between the frame portion 93 and the combination of the device substrate 11 and the opposite substrate 12, the formation of the indentations 917a may be omitted.

Herein, the conductor layer 40 is formed to cover end portions of the second surface 12b of the opposite substrate 12. On the second surface 12b of the opposite substrate 12, the front surface-side conductive film 18 is formed to extend to the edges of the second surface 12b. Meanwhile, the upper polarizing plate 15a has a size smaller than the area formed with the front surface-side conductive film 18, and the front surface-side conductive film 18 is exposed from edge portions of the upper polarizing plate 15a. Therefore, the conductor layer 40 is in contact with the front surface and the side end surfaces of the front surface-side conductive film 18, and is electrically connected to the front surface-side conductive film 18.

Further, a gap between the device substrate 11 and the frame portion 93 is also filled with the conductor layer 40. In respective bottom portions of the indentations 917a, the conductor layer 40 is in contact with the upper surface and the side end surfaces of the conductive tape 28, and is electrically connected to the conductive tape 28. Therefore, the conductor layer 40 is held at the ground potential (constant potential) via the conductive tape 28, and the front surface-side conductive film 18 is held at the ground potential (constant potential) via the conductor layer 40.

In the present embodiment, the uppermost position of the frame portion 93 is higher than the liquid crystal panel 1. In the application of the conductive paste, therefore, the conductive paste is prevented from overflowing outside the frame portion 93. Further, the upper surface of the conductor layer 40 is located at an intermediate position in the thickness direction of the upper polarizing plate 15a, and does not substantially cover the upper polarizing plate 15a.

Method of Assembling Electro-Optical Device 100: To assemble the electro-optical device 100 of the present embodiment, the front surface-side conductive film 18 is first formed on the second surface 12b of the opposite substrate 12 before or after the opposite substrate 12 is assembled into the liquid crystal panel 1. In this case, from the viewpoint of avoiding the influence of the temperature and plasma in the formation of the front surface-side conductive film 18, it is preferred to form the front surface-side conductive film 18 on the second surface 12b of the opposite substrate 12 before the opposite substrate 12 is assembled into the liquid crystal panel 1. Then, the upper polarizing plate 15a and the lower polarizing plate 15b are respectively bonded to the two surfaces of the liquid crystal panel 1.

Further, the light guide plate 6 and the optical sheets (the scattering plates 23 and 26 and the prism sheets 24 and 25) are laminated inside the resin case 91. Thereafter, the light-shielding sheet 29 is superimposed to cover the end portion 6e of the light guide plate 6. Then, the double-sided tape 21 is attached onto the light-shielding sheet 29. Subsequently, the band-like portion 72 of the flexible substrate 7 is bent such that the surface of the light source mounting portion 71 mounted with the point-like light sources 3 faces downward, and the light source mounting portion 71 is superimposed on the first surface 6a in the end portion 6e of the light guide plate 6. Then, the light source mounting portion 71 is pressed against the double-sided tape 21, and is fixed to the end portion 6e of the light guide plate 6 via the double-sided tape 21 and the light-shielding sheet 29.

As a result, the illumination device 8 is completed. Then, the liquid crystal panel 1 having the upper polarizing plate 15a and the lower polarizing plate 15b attached to the two surfaces thereof is superimposed on the illumination device 8. Thereby, the illumination device 8 and the liquid crystal panel 1 are supported by the resin case 91. If the resin case 91 is stored in the metal case 92, therefore, the assembling of the electro-optical device 100 is completed. In this process, the conductive tape 28 is bonded to the upper surface of the step portion 911 of the resin case 91, and end portions of the conductive tape 28 are bonded to the conductive pattern 742 of the flexible substrate 7. Then, the liquid crystal panel 1 is placed on the upper surface of the step portion 911 of the resin case 91. Thereby, the conductive tape 28 is bonded to the second surface 11b of the device substrate 11 in the liquid crystal panel 1.

Thereafter, the indentations 917a formed in the side plate portions 917 of the resin case 91 are applied and filled with a conductive paste. Then, the conductive paste is hardened to form the conductor layer 40. As a result, the electro-optical device 100 is completed.

Major Effects of Present Embodiment: As described above, in the present embodiment, the gap between the opposite substrate 12 and the frame portion 93 surrounding the respective peripheries of the device substrate 11 and the opposite substrate 12 in the support member 9 is filled with the conductor layer 40 containing conductive particles dispersed in a matrix. The conductor layer 40 covers the front surface-side conductive film 18 formed on the second surface 12b of the opposite substrate 12, and is electrically connected to the front surface-side conductive film 18. If the conductor layer 40 is held at a constant potential, therefore, the front surface-side conductive film 18 is also held at a constant potential via the conductor layer 40. Accordingly, it is possible to prevent the opposite substrate 12 from being charged. Herein, the conductor layer 40 is a layer containing conductive particles dispersed in a matrix, and can be formed by the application and subsequent hardening of a conductive paste. It is therefore possible to reliably achieve electrical connection between the front surface-side conductive film 18 and the conductor layer 40. It is also possible to easily and reliably achieve, in a deep portion of a gap between the opposite substrate 12 and the frame portion 93, electrical connection of the conductor layer 40, which has been formed by the application and subsequent hardening of a conductive paste, to the conductive tape 28 held at a constant potential.

Further, in the present embodiment, inner surfaces of the frame portion 93 are formed with the indentations 917a which locally increase the width of the gap between the frame portion 93 and the opposite substrate 12, and the interior of each of the indentations 917a is filled with the conductor layer 40. It is therefore possible to fill the gap between the frame portion 93 of the support member 9 and the opposite substrate 12 with a sufficient amount of the conductor layer 40 (conductive paste). Accordingly, it is possible to reliably achieve, in a deep portion of the gap between the opposite substrate 12 and the frame portion 93, electrical connection of the conductor layer 40 to the conductive tape 28 held at a constant potential.

Further, in the present embodiment, the conductive tape 28 is directly bonded to the conductive pattern 742 of the flexible substrate 7. It is therefore possible to hold the front surface-side conductive film 18 at the ground potential in a small space. Further, it is unnecessary to use a special conductive cable.

Further, the conductive tape 28 is a double-sided tape having a conductive adhesive layer formed on each of both surfaces thereof. The conductive tape 28 is also used to fix the device substrate 11 (insulating substrate 110) and the support member 9 (resin case 91) to each other, and thus provides an advantage of not using a separate double-sided tape for fixing the device substrate 11 (insulating substrate 110) and the support member 9 (resin case 91) to each other.

Second Embodiment

Figure 7:
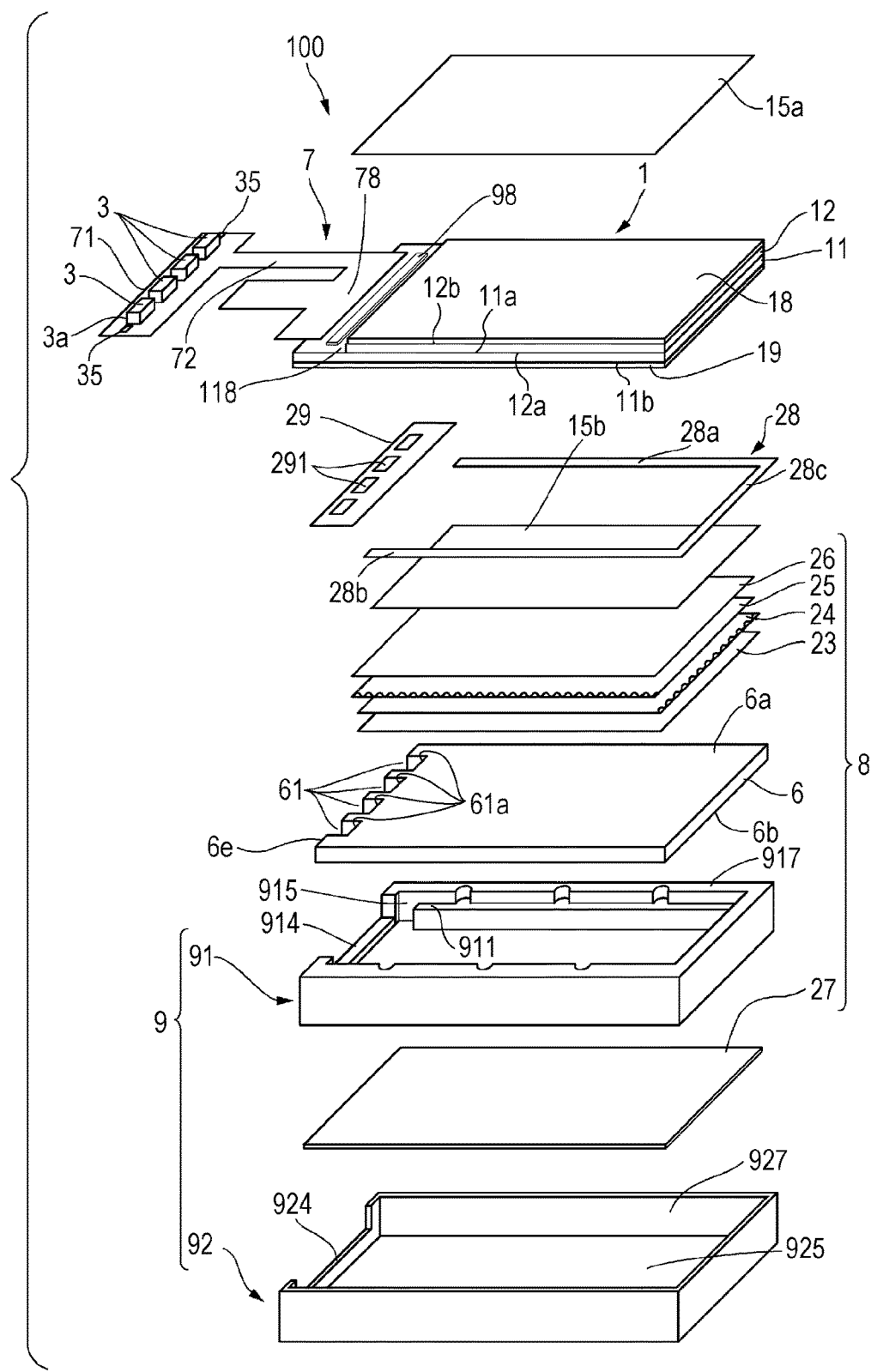
FIG. 7 is an exploded perspective view of an electro-optical device according to a second embodiment.
Figure 8A:
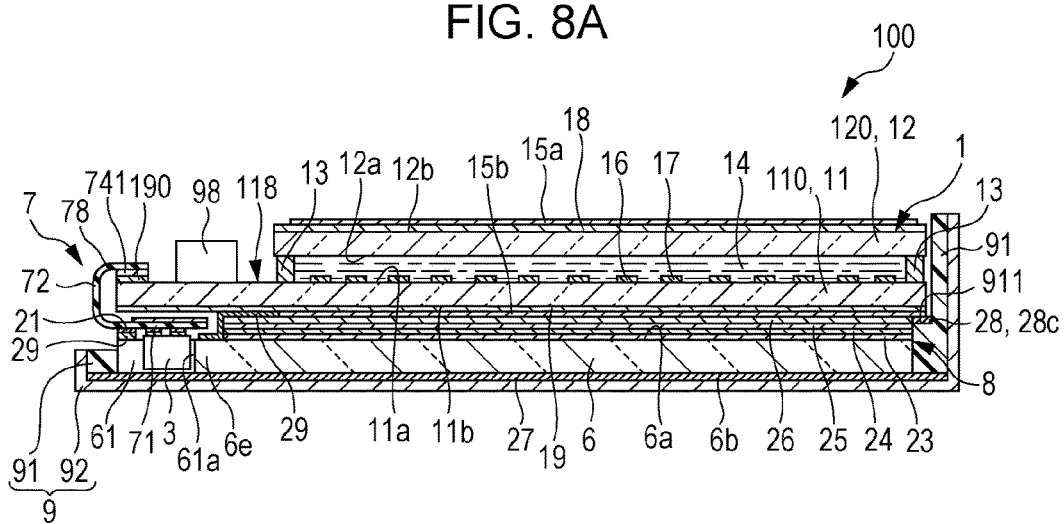
FIGS. 8A and 8B are cross-sectional views schematically illustrating the electro-optical device according to the second embodiment cut at positions corresponding to lines VIIIA-VIIIA and VIIIB-VIIIB in FIG. 1, respectively.
Figure 8B:
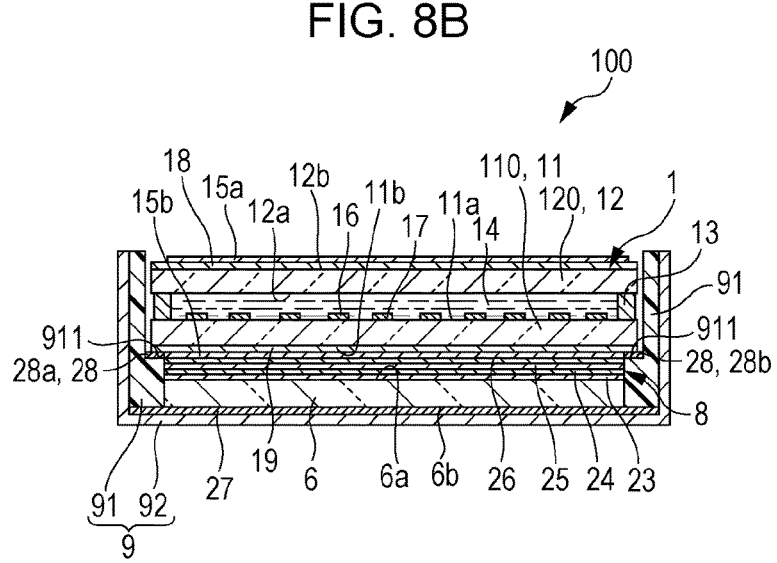

FIG. 7 is an exploded perspective view of an electro-optical device according to a second embodiment. FIGS. 8A and 8B are cross-sectional views schematically illustrating the electro-optical device according to the second embodiment cut at positions corresponding to lines VIIIA-VIIIA and VIIIB-VIIIB in FIG. 1, respectively. A basic configuration of the present embodiment is similar to the configuration of the first embodiment. Thus, the common components will be illustrated with the same reference numerals, and description thereof will be omitted.

Also in the electro-optical device 100 illustrated in FIGS. 7, 8A, and 8B, the gap between the opposite substrate 12 and the frame portion 93 surrounding the respective peripheries of the device substrate 11 and the opposite substrate 12 in the support member 9 is filled with the conductor layer 40 containing conductive particles dispersed in a matrix, as described in the first embodiment with reference to, for example, FIGS. 1, 6A, and 6B. The conductor layer 40 is electrically connected to the front surface-side conductive film 18 formed on the second surface 12b of the opposite substrate 12, and is also electrically connected to the conductive tape 28 attached to the second surface 11b of the device substrate 11. Further, the conductive tape 28 is also bonded to the conductive pattern 742 (ground pattern) formed on the flexible substrate 7. Therefore, it is possible to hold the front surface-side conductive film 18 at the ground potential, and thus to prevent the opposite substrate 12 from being charged.

Further, with the use of the conductive tape 28, the present embodiment prevents the generation of high-frequency noise sound attributed to the charging of the scattering plate 26, the prism sheet 25, the prism sheet 24, the scattering plate 23, or the light guide plate 6, as described below.

First, in the present embodiment, the entire surface or a substantially entire surface of the second surface 11b of the device substrate 11 is provided with a rear surface-side conductive film 19 (second conductive film) formed by a translucent conductive film, such as an ITO film, and serving as a charging preventing conductive film. Further, on the side of the second surface 11b of the device substrate 11, the conductive tape 28 is attached to the rear surface-side conductive film 19 along three sides of the device substrate 11. Also in the present embodiment, the conductive tape 28 is a double-sided tape having a conductive adhesive layer formed on each of both surfaces of a metal film. Therefore, the rear surface-side conductive film 19 is held at the ground potential (constant potential) via the conductive tape 28. Accordingly, it is possible to prevent the insulating substrate 110 and insulating members (the lower polarizing plate 15b, the scattering plate 26, the prism sheet 25, the prism sheet 24, the scattering plate 23, and the light guide plate 6) from being charged.

Further, the conductive tape 28 is attached to a wide area of the rear surface-side conductive film 19. Even if the rear surface-side conductive film 19 has a high sheet resistance, therefore, it is possible to reliably hold the entirety of the rear surface-side conductive film 19 at a constant potential. Accordingly, it is possible to reliably prevent the insulating substrate 110 and the insulating members (the lower polarizing plate 15b, the scattering plate 26, the prism sheet 25, the prism sheet 24, the scattering plate 23, and the light guide plate 6) from being charged. Even if the common electrodes 17 are applied with a common potential of a predetermined frequency, therefore, charging and vibration of the insulating members (the lower polarizing plate 15b, the scattering plate 26, the prism sheet 25, the prism sheet 24, the scattering plate 23, and the light guide plate 6) do not occur. Accordingly, it is possible to reliably prevent the generation of high-frequency noise.

Modified Examples of First and Second Embodiments

Figure 9:
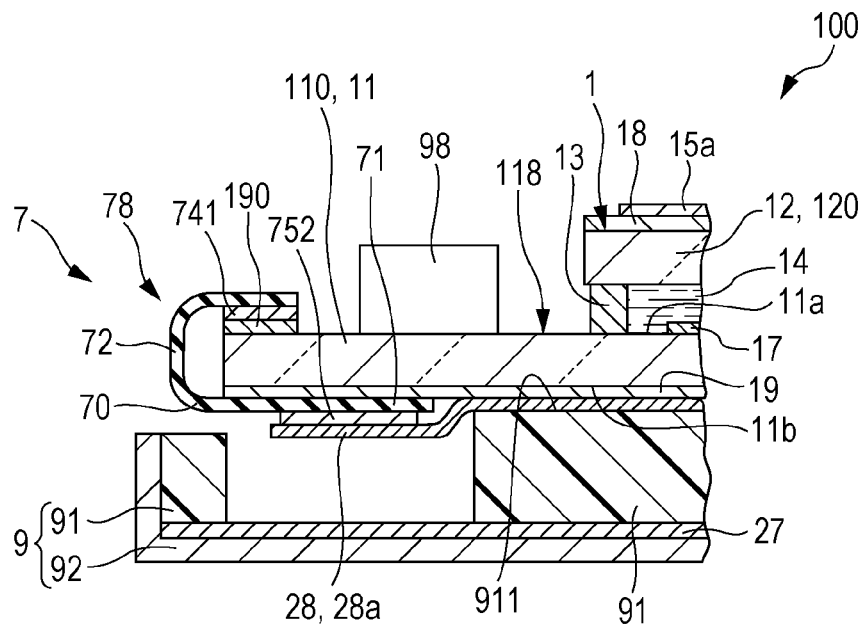
FIG. 9 is a cross-sectional view illustrating a connection structure between a conductive tape and a flexible substrate in an electro-optical device according to a first modified example of the second embodiment.
Figure 10:
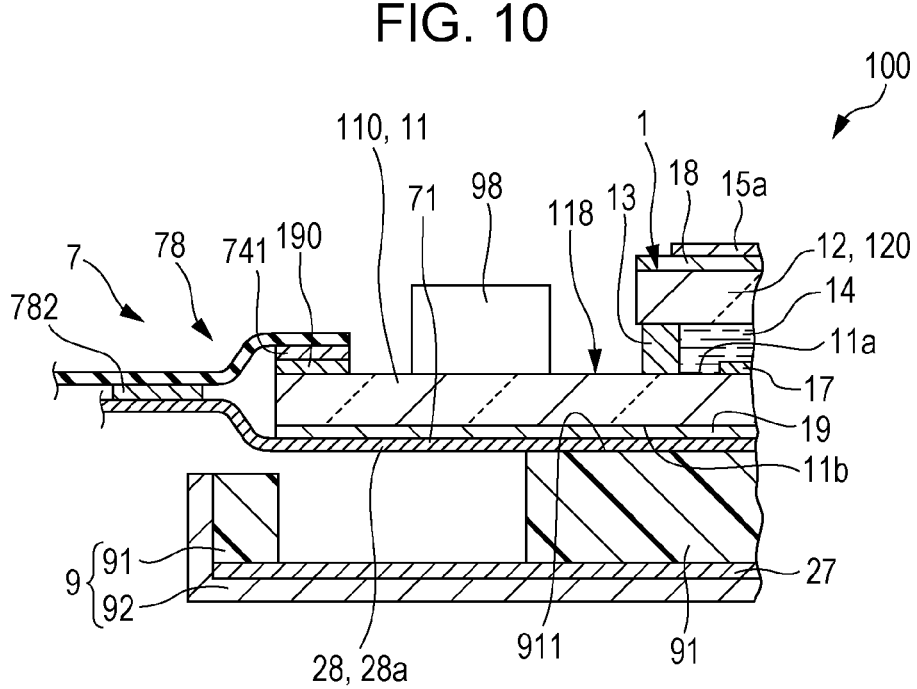
FIG. 10 is a cross-sectional view illustrating a connection structure between the conductive tape and the flexible substrate in an electro-optical device according to a second modified example of the second embodiment.
Figure 11:
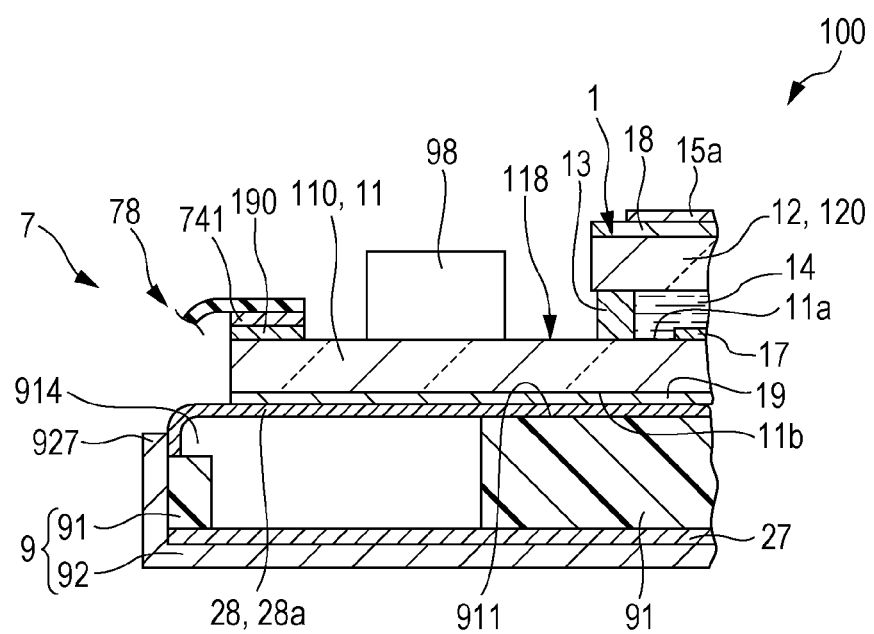
FIG. 11 is a cross-sectional view illustrating a connection structure between the conductive tape and a metal case in an electro-optical device according to a third modified example of the second embodiment.

FIGS. 9, 10, and 11 are cross-sectional views illustrating connection structures between the conductive tape 28 and the flexible substrate 7 in electro-optical devices according to first, second, and third modified examples of the second embodiment, respectively. The drawings correspond to cross-sectional views of the electro-optical devices cut at positions corresponding to lines IX-IX, X-X, and XI-XI in FIG. 1, respectively. A basic configuration of the present examples is similar to the configuration of the first embodiment. Thus, the common components will be illustrated with the same reference numerals, and description thereof will be omitted.

Also in the electro-optical device 100 illustrated in FIG. 9, the conductive tape 28 is attached to the rear surface-side conductive film 19 on the second surface 11b of the device substrate 11 such that the conductive tape 28 extends along three sides of the device substrate 11, similarly as in the second embodiment. Herein, a surface of the light source mounting portion 71 of the flexible substrate 7 mounted with the point-like light sources 3 described with reference to FIGS. 3A and 4A is formed with a conductive pattern 752 (ground pattern), and the conductive pattern 752 is bonded to one surface of the conductive tape 28. The other configurations are similar to the corresponding configurations of the first and second embodiments, and thus description thereof will be omitted.

Also in the electro-optical device 100 illustrated in FIG. 10, the conductive tape 28 is attached to the rear surface-side conductive film 19 on the second surface 11b of the device substrate 11 such that the conductive tape 28 extends along three sides of the device substrate 11, similarly as in the second embodiment. Herein, a surface of the main body portion 78 of the flexible substrate 7 provided with the terminal 741 is formed with a conductive pattern 782 (ground pattern), and the conductive pattern 782 is bonded to one surface of the conductive tape 28. The other configurations are similar to the corresponding configurations of the first and second embodiments, and thus description thereof will be omitted.

Also in the electro-optical device 100 illustrated in FIG. 11, the conductive tape 28 is attached to the rear surface-side conductive film 19 on the second surface 11b of the device substrate 11 such that the conductive tape 28 extends along three sides of the device substrate 11, similarly as in the second embodiment. Herein, the metal case 92 is held at the ground potential, and is configured such that a portion of a side plate portion 927 of the metal case 92 is directly exposed to the inside from the recessed portion 914 of the resin case 91. In the present example, therefore, one surface of the conductive tape 28 is bonded to the inner surface of the side plate portion 927 of the metal case 92. The other configurations are similar to the corresponding configurations of the first and second embodiments, and thus description thereof will be omitted.

The above-described modified examples are application examples of the configurations illustrated in FIGS. 9 to 11, as based on the second embodiment. The configurations illustrated in FIGS. 9 to 11 may also be applied on the basis of the first embodiment.

Third Embodiment

Figure 12:
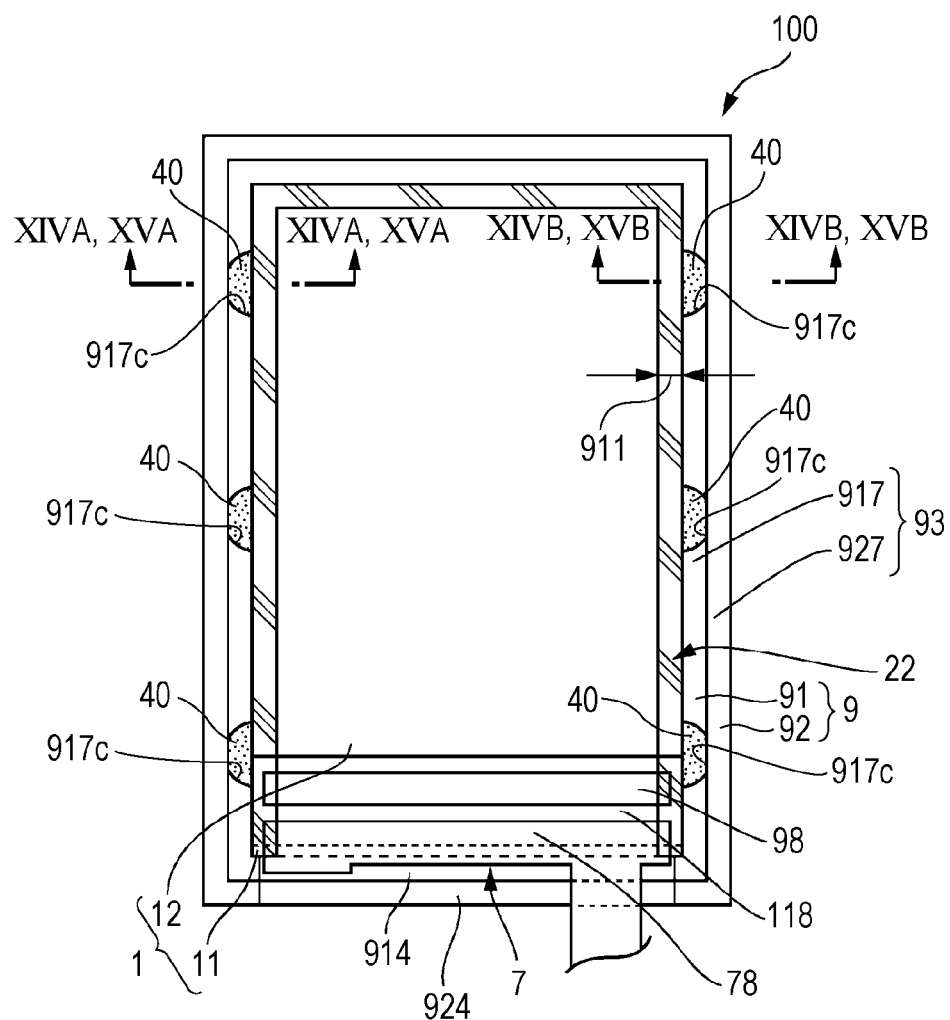
FIG. 12 is a plan view of an electro-optical device according to a third embodiment.
Figure 13:
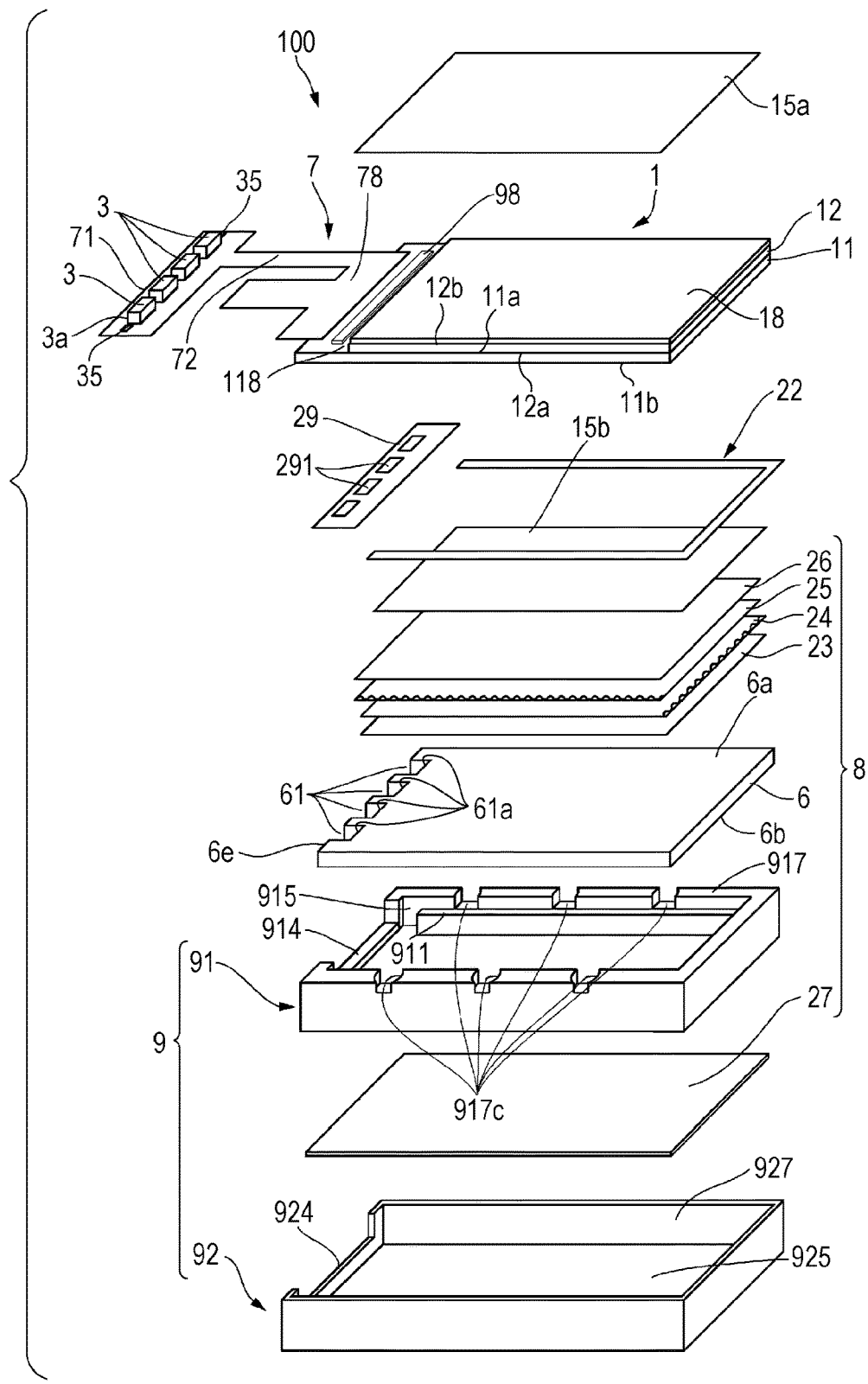
FIG. 13 is an exploded perspective view of the electro-optical device according to the third embodiment.
Figure 14A:
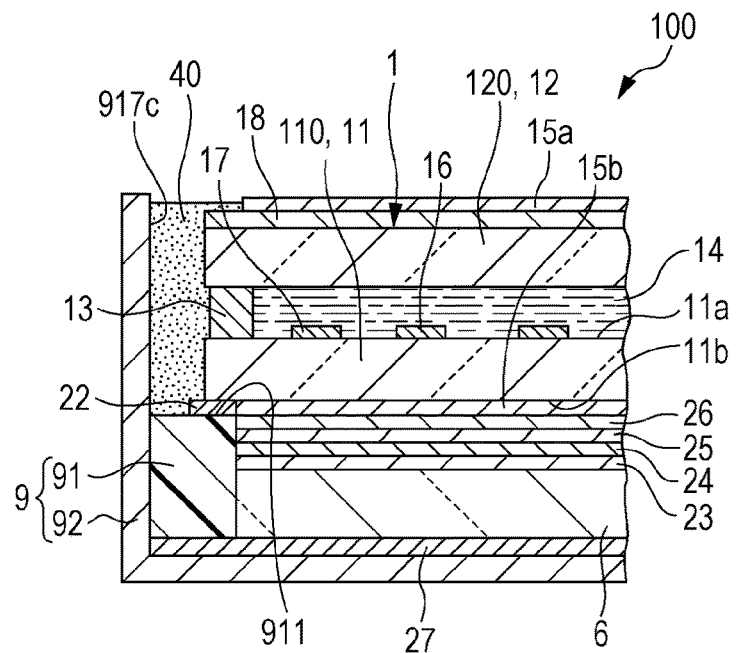
FIGS. 14A and 14B are cross-sectional views schematically illustrating the electro-optical device according to the third embodiment cut at positions corresponding to lines XIVA-XIVA and XIVB-XIVB in FIG. 12, respectively.
Figure 14B:
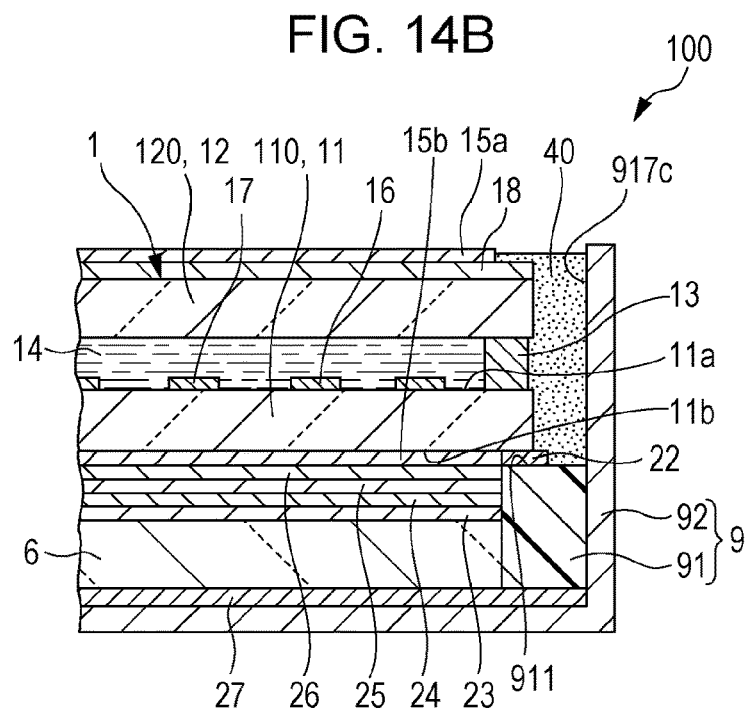

FIGS. 12 and 13 are a plan view and an exploded perspective view of an electro-optical device according to a third embodiment, respectively. FIGS. 14A and 14B are cross-sectional views schematically illustrating the electro-optical device according to the third embodiment cut at positions corresponding to lines XIVA-XIVA and XIVB-XIVB in FIG. 12, respectively. A basic configuration of the present embodiment is similar to the configuration of the first embodiment. Thus, the common components will be illustrated with the same reference numerals, and description thereof will be omitted.

As described with reference to FIGS. 1 to 4B, in the electro-optical device 100 of the present embodiment, the base material of the opposite substrate 12 is formed by the translucent insulating substrate 120, and the first surface 12a of the opposite substrate 12 is not formed with an electrode or the like. Further, the opposite substrate 12 is arranged on the outer side. If a charged finger approaches the opposite substrate 12, therefore, the opposite substrate 12 is charged. The charging disturbs the orientation of the liquid crystal 14, and degrades the image quality. Therefore, the translucent front surface-side conductive film 18 formed by an ITO film, an IZO film, or the like is provided on the entire surface or a substantially entire surface of the second surface 12b of the opposite substrate 12. The front surface-side conductive film 18 is held at a constant potential (ground potential in the present embodiment) by the configuration described below.

First, in the present embodiment, a double-sided tape 22 is attached to the second surface 11b of the device substrate 11 along three sides of the device substrate 11, as illustrated in FIGS. 12, 13, 14A, and 14B. The double-sided tape 22 is not a conductive tape, but is a light-shielding insulating tape. The double-sided tape 22 has a function of fixing the device substrate 11 to the resin case 91.

Further, in the support member 9, side plate portions 917 of the resin case 91 forming inner surfaces of the frame portion 93 are formed with a plurality of indentations 917c which extend from the upper surface of the side plate portions 917 to a position reaching the upper surface of the step portion 911, similarly as in the first embodiment. Herein, the indentations 917c pierce through the side plate portions 917 in the thickness direction (inside-outside direction), and the side plate portions 927 of the metal case 92 are exposed in the indentations 917c.

The interior of each of the plurality of indentations 917c (the gap between the frame 93 and the combination of the device substrate 11 and the opposite substrate 12) is filled with the conductor layer 40. The conductor layer 40 is formed by the application and subsequent hardening of a conductive paste, and contains conductive particles, such as carbon particles, dispersed in a matrix, such as resin or rubber, similarly as in the first embodiment. In the present embodiment, the indentations 917c are formed at respective positions separate from one another at substantially equal intervals in each of two of the four side plate portions 917 of the resin case 91 located in the direction of the longer sides of the resin case 91. In a portion not formed with the indentations 917c, a gap between the frame portion 93 and the combination of the device substrate 11 and the opposite substrate 12 is not filled with the conductor layer 40. Each of the indentations 917c is formed into a circular arc shape in a plan view.

Further, the conductor layer 40 is formed to cover end portions of the second surface 12b of the opposite substrate 12. On the side of the second surface 12b of the opposite substrate 12, the conductor layer 40 is in contact with the front surface and the side end surfaces of the front surface-side conductive film 18, and is electrically connected to the front surface-side conductive film 18.

In the thus configured electro-optical device 100, the metal case 92 is held at the ground potential (constant potential). Therefore, the conductor layer 40 is held at the ground potential (constant potential) via the metal case 92, and the front surface-side conductive film 18 is held at the ground potential (constant potential) via the conductor layer 40. It is therefore possible to prevent the opposite substrate 12 from being charged.

Further, the frame portion 93 is formed with the indentations 917c which locally increase the width of the gap between the frame portion 93 and the opposite substrate 12. In the indentations 917c, the side plate portions 927 of the metal case 92 are exposed. Further, the interior of each of the indentations 917c is filled with the conductor layer 40. It is therefore possible to fill the gap between the frame portion 93 of the support member 9 and the opposite substrate 12 with a sufficient amount of the conductor layer 40 (conductive paste), and to electrically connect the front surface-side conductive film 18 to the metal case 92 in a short path. Accordingly, it is possible to reliably prevent the opposite substrate 12 from being charged.

Modified Example of Third Embodiment

Figure 15A:
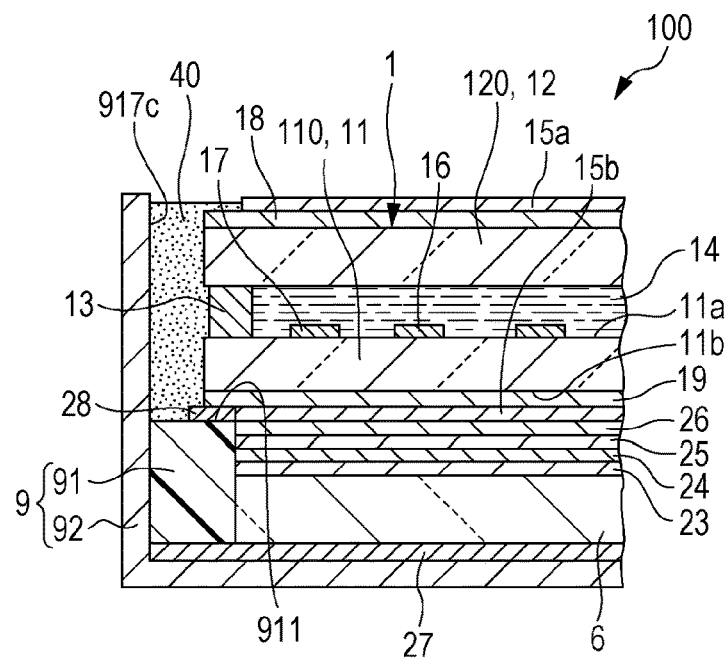
FIGS. 15A and 15B are cross-sectional views schematically illustrating an electro-optical device according to a modified example of the third embodiment cut at positions corresponding to lines XVA-XVA and XVB-XVB in FIG. 12, respectively.
Figure 15B:
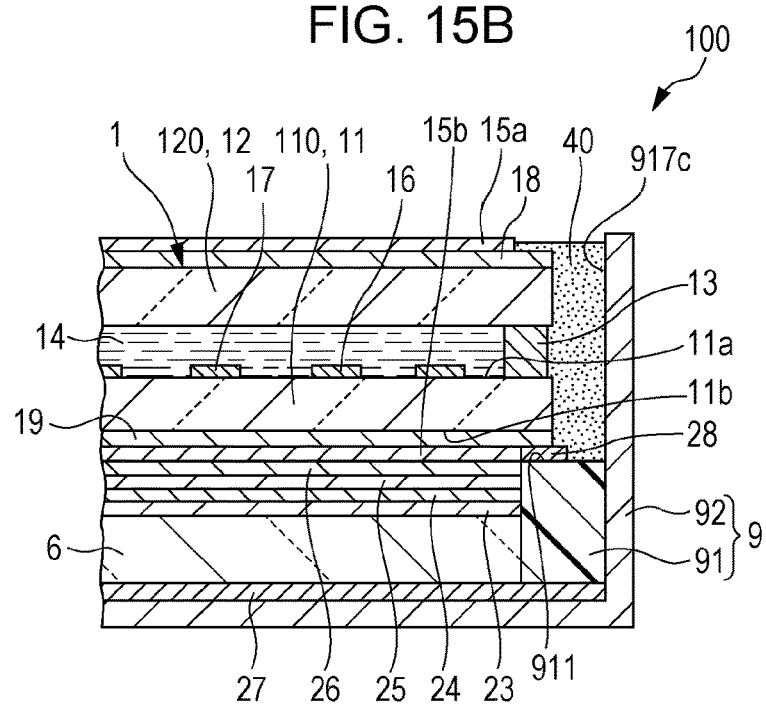

FIGS. 15A and 15B are cross-sectional views schematically illustrating an electro-optical device according to a modified example of the third embodiment cut at positions corresponding to lines XVA-XVA and XVB-XVB in FIG. 12, respectively. A basic configuration of the present example corresponds to a structure of the third embodiment, in which the double-sided tape 22 is replaced with the conductive tape 28 and the second surface 11b of the device substrate 11 is formed with the rear surface-side conductive film 19 for preventing charging. The other configurations are similar to the corresponding configurations of the first to third embodiments. Thus, the common components will be illustrated with the same reference numerals, and description thereof will be omitted.

Also in the electro-optical device 100 of the present example, the base material of the opposite substrate 12 is formed by the translucent insulating substrate 120, and the entire surface or a substantially entire surface of the second surface 12b is provided with the translucent front surface-side conductive film 18 formed by an ITO film, an IZO film, or the like, similarly as in the first, second, and third embodiments. Further, as illustrated in FIGS. 15A and 15B, the entire surface or a substantially entire surface of the second surface 11b of the device substrate 11 (the rear surface of the insulating substrate 110) is provided with the rear surface-side conductive film 19, and the conductive tape 28 is attached to the rear surface-side conductive film 19 along three sides of the insulating substrate 110, similarly as in the second embodiment.

In the present example, side plate portions 917 of the resin case 91 forming inner surfaces of the frame portion 93 in the support member 9 are formed with the indentations 917c piercing through the side plate portions 917 in the thickness direction (inside-outside direction), and the side plate portions 927 of the metal case 92 are exposed in the indentations 917c, similarly as in the third embodiment. Further, the interior of each of the plurality of indentations 917c (the gap between the frame portion 93 and the combination of the device substrate 11 and the opposite substrate 12) is filled with the conductor layer 40.

The conductor layer 40 is formed to cover end portions of the second surface 12b of the opposite substrate 12, and is electrically connected to the front surface-side conductive film 18. It is therefore possible to hold the front surface-side conductive film 18 at a constant potential (ground potential), and thus to prevent the opposite substrate 12 from being charged.

Further, the conductor layer 40 is electrically connected to the conductive tape 28 in respective bottom portions of the indentations 917c. It is therefore possible to hold the rear surface-side conductive film 19 at a constant potential (ground potential). Accordingly, it is possible to prevent the insulating members (the lower polarizing plate 15b, the scattering plate 26, the prism sheet 25, the prism sheet 24, the scattering plate 23, and the light guide plate 6) from being charged.

Other Embodiments

In the above-described embodiments, the front surface-side conductive film 18 and the rear surface-side conductive film 19 are held at the ground potential via the conductor layer 40. The front surface-side conductive film 18 and the rear surface-side conductive film 19 may also be held at a constant potential other than the ground potential. In this case, the use of the constant potential used in the electro-optical device 100 provides an advantage of not using a separate power supply circuit.

The above-described embodiments use a double-sided tape having a conductive adhesive layer formed on each of both surfaces thereof. In the configuration illustrated in FIG. 9 or 11, however, the conductivity of only one surface of the conductive tape 28 is used. In such a case, a double-sided tape may be used which has a conductive adhesive layer formed only on one surface thereof and has an insulating adhesive layer formed on the other surface thereof. Further, in the configuration illustrated in FIG. 9 or 11, the conductivity of only one surface of the conductive tape 28 is used. Therefore, a single-sided tape may be used which has a conductive adhesive layer formed only on one surface thereof and has no adhesive layer formed on the other surface thereof. Further, to bond the device substrate 11 and the resin case 91 together, a double-sided tape not including a conductive adhesive layer may be inserted between the conductive tape 28 and the resin case 91.

In the above-described embodiments, the conductive tape 28 or the double-sided tape 22 has the function of bonding the device substrate 11 and the resin case 91 together. The conductive tape 28 or the double-sided tape 22 may also be used to bond the device substrate 11 and an optical sheet together.

In the above-described embodiments, the description has been made of the example in which the present application is applied to the electro-optical device 100 using the liquid crystal panel 1. The present application may also be applied to an electro-optical device, such as an organic electroluminescence device and an image sensor, in which the opposite substrate is placed as a sealing substrate or a cover for the device substrate, in order to prevent the opposite substrate from being charged.

Examples of Mounting on Electronic Equipment

Figure 16A:
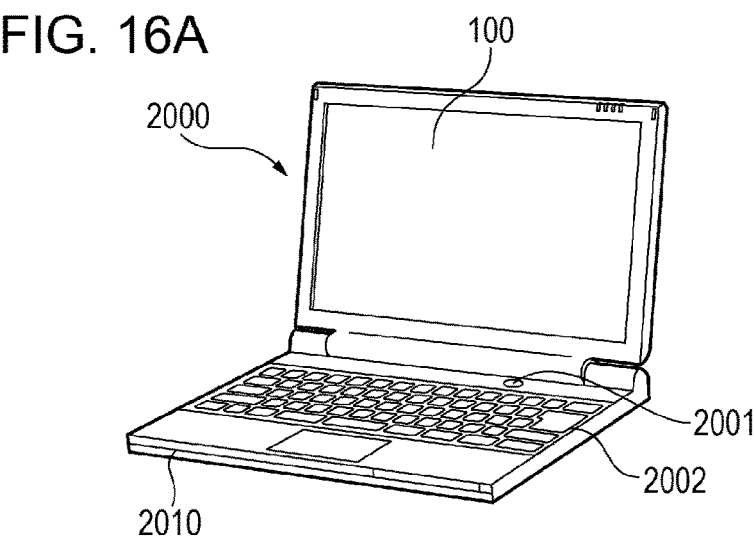
FIGS. 16A to 16C are explanatory diagrams of electronic equipment using an input function-equipped display device according to an embodiment.
Figure 16B:
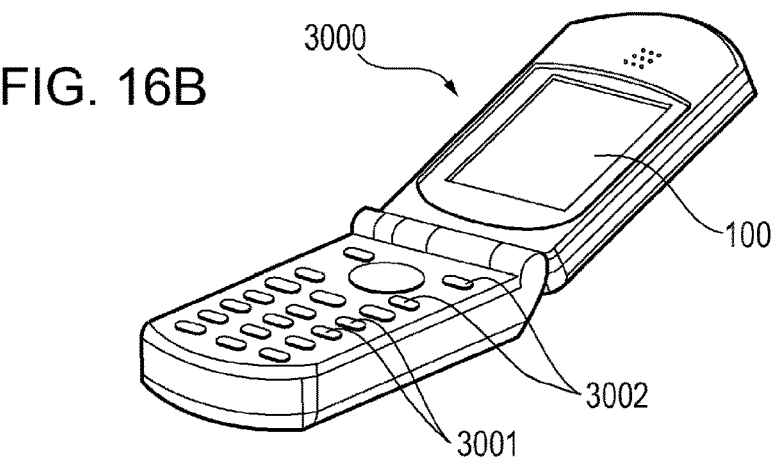
Figure 16C:
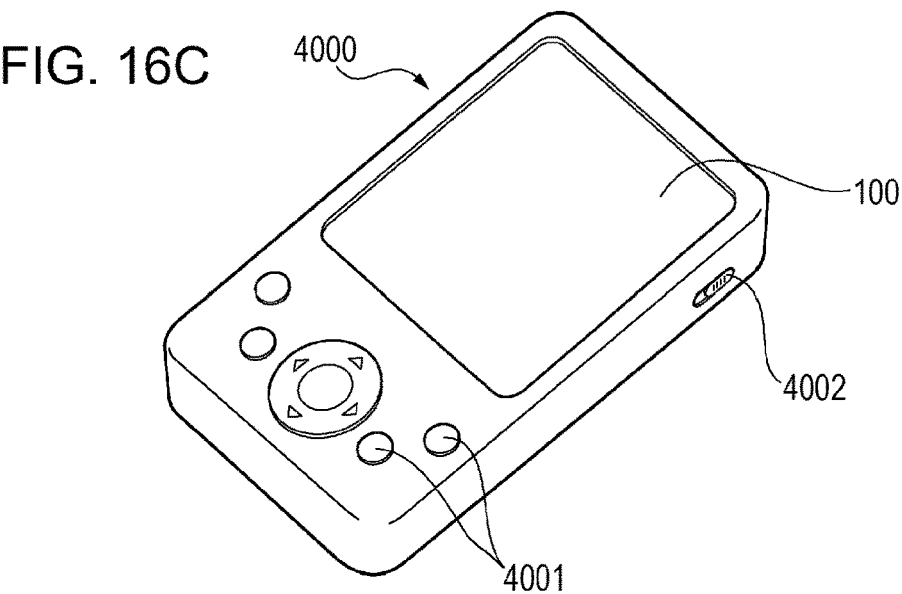

Subsequently, description will be made of electronic equipment applied with the electro-optical device 100 according to the above-described embodiments. FIG. 16A illustrates a configuration of a mobile personal computer including the electro-optical device 100. A personal computer 2000 includes the electro-optical device 100 serving as a display unit and a main body portion 2010. The main body portion 2010 is provided with a power switch 2001 and a keyboard 2002. FIG. 16B illustrates a configuration of a mobile phone including the electro-optical device 100. A mobile phone 3000 includes a plurality of operation buttons 3001 and scroll buttons 3002 and the electro-optical device 100 serving as a display unit. In accordance with the operation of the scroll buttons 3002, the screen displayed on the electro-optical device 100 is scrolled. FIG. 16C illustrates a configuration of a mobile information terminal (PDA: Personal Digital Assistant) applied with the electro-optical device 100. A mobile information terminal 4000 includes a plurality of operation buttons 4001, a power switch 4002, and the electro-optical device 100 serving as a display unit. In accordance with the operation of the power switch 4002, a variety of information, such as an address book and a schedule book, is displayed on the electro-optical device 100.

The electronic equipment applied with the electro-optical device 100 includes, as well as the examples illustrated in FIGS. 16A to 16C, electronic equipment such as a digital still camera, a liquid crystal television, a viewfinder or direct monitor viewing video tape recorder, a car navigation device, a pager, an electronic notebook, a calculator, a word processor, a workstation, a videophone, a POS (Point-Of-Sale) terminal, and a banking terminal. Further, it is possible to apply the foregoing electro-optical device 100 as a display unit of these various types of electronic equipment.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention is claimed as follows:

1. An electro-optical device comprising:
a first substrate;
a second substrate having a first surface opposite to the first substrate;
a metal case having an inner side including a bottom portion and a frame portion rising continuously from the bottom portion, and configured to hold the first and second substrates so that the first substrate is located between the second substrate and the bottom portion and so that the first substrate and the second substrate are surrounded by the frame portion;
a first conductive film formed on a second surface of the second substrate;
a conductor member placed between the frame portion and the first and second substrates, and electrically connected to the first conductive film; and
a polarizing plate formed on the first conductive film,
wherein the first conductive film is held at a constant potential via the conductor member, and
wherein the conductor member is in contact with the inner side of the metal case.

2. The electro-optical device according to claim 1, wherein the conductive member includes a first conductive portion placed between the frame portion and the first and second substrates, and a second conductive portion placed between the first substrate and the bottom portion.

3. The electro-optical device according to claim 2, wherein the first conductive portion is formed of a conductive paste including a matrix material and a plurality of conductive particles contained in the matrix material.

4. The electro-optical device according to claim 2, further comprising:
a second conductive film formed on a second surface of the first substrate; and
an insulating member arranged on the side of the second surface of the first substrate,
wherein a base material of the first substrate is an insulating substrate, and
wherein the second conductive portion is electrically connected to the second conductive film on the side of the second surface of the first substrate.

5. The electro-optical device according to claim 2, wherein the inner side of the metal case includes an exposed portion, and the second conductive portion of the conductive member is in contact with the exposed portion of the metal case.

6. The electro-optical device according to claim 2, wherein
an uppermost position of the metal case is positioned above an upper surface of the second substrate that is stacked on the first substrate.

7. Electronic equipment comprising the electro-optical device according to claim 2.

8. The electro-optical device according to claim 1, wherein the first substrate is attached with a tape for fixing the first substrate to a support member located between the first substrate and the bottom portion.

9. The electro-optical device according to claim 1, wherein
an uppermost position of the metal case is positioned above an upper surface of the second substrate that is stacked on the first substrate.

10. Electronic equipment comprising the electro-optical device according to claim 1.

* * * * *